United States Patent
Kim et al.

(10) Patent No.: US 8,410,347 B2
(45) Date of Patent: Apr. 2, 2013

(54) MUSIC RECOMMENDATION METHOD WITH RESPECT TO MESSAGE SERVICE

(75) Inventors: Jung Eun Kim, Yongin-si (KR); Hyoung Gook Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 11/889,622

(22) Filed: Aug. 15, 2007

(65) Prior Publication Data

US 2008/0147215 A1 Jun. 19, 2008

(30) Foreign Application Priority Data

Dec. 13, 2006 (KR) .................. 10-2006-0127171

(51) Int. Cl.
*G10H 1/00* (2006.01)
(52) U.S. Cl. ............. 84/615; 84/618; 84/653; 84/656
(58) Field of Classification Search .................. None
See application file for complete search history.

(56) References Cited

U.S. PATENT DOCUMENTS

| | | | |
|---|---|---|---|
| 2003/0032363 A1* | 2/2003 | Kawashiro | 446/226 |
| 2003/0089218 A1* | 5/2003 | Gang et al. | 84/615 |
| 2004/0237759 A1* | 12/2004 | Bill | 84/668 |
| 2006/0065105 A1* | 3/2006 | Iketani et al. | 84/609 |
| 2006/0130636 A1* | 6/2006 | Toledano et al. | 84/600 |
| 2007/0119288 A1* | 5/2007 | Makino | 84/602 |
| 2007/0137463 A1* | 6/2007 | Lumsden | 84/603 |
| 2009/0044686 A1* | 2/2009 | Vasa | 84/609 |
| 2009/0272251 A1* | 11/2009 | Georges et al. | 84/609 |

FOREIGN PATENT DOCUMENTS

| | | |
|---|---|---|
| KR | 10-2002-0025579 | 4/2002 |
| KR | 10-2007-0087398 | 8/2007 |

OTHER PUBLICATIONS

Korean Notice of Allowance dated Oct. 29, 2007 in corresponding Korean Patent Application No. 10-2006-0127171.

* cited by examiner

*Primary Examiner* — Marlo Fletcher
(74) *Attorney, Agent, or Firm* — Staas & Halsey LLP

(57) ABSTRACT

A music recommendation method and a music recommendation system are provided. The music recommendation method includes: selecting music files according to a theme of the message service and music, a mood of the music, a similarity between content of the message service and content of the music; and recommending selected music files to a user.

15 Claims, 9 Drawing Sheets

| THEME | mood |
|---|---|
| HAPPINESS | pleasant |
| SORROW | Sad.calm |
| JOURNEY | Exciting |
| YEARNING | Calm |
| .... | .... |

MUSIC RECOMMENDATION METHOD WITH RESPECT TO MESSAGE SERVICE

CROSS-REFERENCE TO RELATED APPLICATION

This application claims the benefit of Korean Patent Application No. 10-2006-0127171, filed on Dec. 13, 2006, in the Korean Intellectual Property Office, the disclosure of which is incorporated herein by reference.

BACKGROUND OF THE INVENTION

1. Field of the Invention

The present invention relates to a music recommendation method which can automatically recommend appropriate music when transmitting a message service in a personal communication terminal, and a system using the method. More particularly, the present invention relates to a music recommendation method which can select a music file according to a theme of the music, a mood of the music, and a similarity between content of a message service and content of the music, and automatically recommend a user the selected music file.

2. Description of Related Art

Currently, since a personal communication terminal such as a mobile phone tends to provide various multimedia functions, there is a tendency in a message service to also provide a multimedia messaging service (MMS) that may attach to transmit a photo, music, and a moving picture included in the message service. An amount of use of the MMS will be rapidly spread since it is possible to transmit a long e-mail or multimedia contents in the personal communication terminal. However, various functions which enable a user to easily use the MMS are needed since the user has an aversion to use the MMS due to inconveniences of procedures for transmitting the MMS and a user interface.

Currently, the personal communication terminal can transmit the music file while transmitting a message of a message service via the MMS, and can store various types of music files in a memory where the music files are stored according to a capacity of the memory is increase. However, a conventional communication terminal has a problem in that, it takes a great amount of time and a great amount of effort to search for an appropriate music file for the message service among stored music files via the MMS. Accordingly, when the user uses the MMS via the personal communication terminal, a new method capable of easily searching for a music file for attachment is needed.

In the conventional art, as an example of selecting appropriate music for an e-mail, there is a method which can automatically select music based on an impression of the music. In the conventional method, character strings are detected from the e-mail, the detected character strings are converted into an impression value using a conversion table, an impression value database of the music is compared with the impression value, and consequently the appropriate music is selected. In this instance, the impression value indicates a reference value which shows emotions felt by a user when the user feels the music. The impression value is analyzed from a physical feature of a music signal, and there are impression values such as extreme, liveliness, refresh, simplicity, tenderness. However, in the conventional art, there is a problem in that, the appropriate music is not accurately selected since the method exclusively relies on the impressions of the music, i.e. the appropriate music with respect to the e-mail is selected by exclusively using the impressions of the music, accordingly there is a probability that a selected music does not corresponds to the e-mail.

Also, a personal communication terminal using the conventional art has a problem in that, a user is required to navigate a plurality of selected music on a limited small screen, and select appropriate music after checking the navigated music when a great number of music having an identical impression value exist.

Also, the personal communication terminal using the convention art has a problem in that, a recommendation rank of a plurality of selected music may not be rated since music having an impression value, corresponding to an e-mail, is randomly displayed.

BRIEF SUMMARY

An aspect of the present invention provides a music recommendation method which can select a music file according to a theme of the music, a mood of the music, and a similarity between content of a message service and content of the music, and automatically recommend to a user the selected music file, and a music recommendation system using the method.

An aspect of the present invention also provides a music recommendation method which can classify a title of music, lyrics of the music, and a text of a message service according to a theme, compare the classified theme, and select the music as a result of the comparison, and a music recommendation system using the method.

An aspect of the present invention also provides a music recommendation method which can recommend music, which is matched with a theme of a message service, by classifying music according to a theme, and also classifying the music according to a mood in a personal communication terminal, and a music recommendation system using the method.

An aspect of the present invention also provides a music recommendation method which can accurately select music, which is matched with a message service, by calculating a similarity between content of lyrics and content of the message service, and a music recommendation system using the method.

According to an aspect of the present invention, there is provided a music recommendation method in a personal communication terminal, including: selecting music files according to a theme of the message service and music, a mood of the music, a similarity between content of the message service and content of the music; and recommending selected music files to a user.

According to another aspect of the present invention, there is provided a music recommendation system including: a music file selection unit selecting music files according to a theme of the message service and music, a mood of the music, a similarity between content of the message service, and content of the music; and a recommendation unit recommending selected music files to a user.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
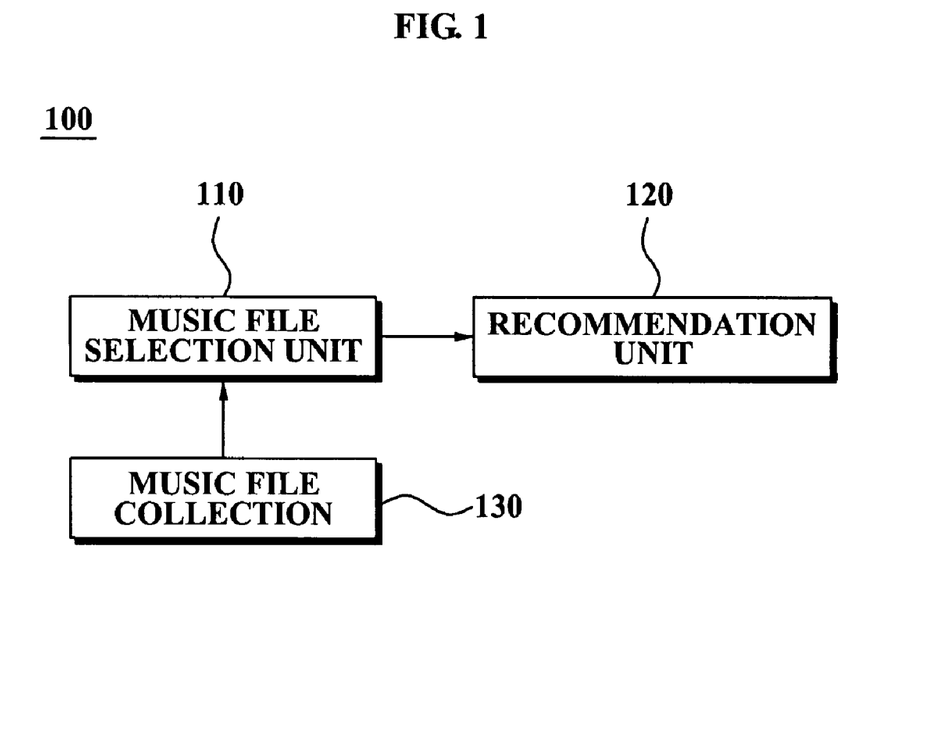
FIG. 1 is a diagram illustrating a music recommendation system with respect to a message service according to an embodiment of the present invention.

FIG. 1 is a diagram illustrating a music recommendation system 100 with respect to a message service according to an embodiment of the present invention.

Referring to FIG. 1, the music recommendation system 100 includes a music file selection unit 110, a recommendation unit 120, and a music file collection 130.

A user inputs, via an input device of the music recommendation system 100, a message service to transmit. Accordingly, the music recommendation system 100 may receive the message service via various input devices such as a keyboard, a keypad, and a touchpad, and the like, (not shown) from the user.

Also, when the user wants to transmit the message service by attaching a music file, the user selects whether to use the music file collection 130 stored in a user terminal, or to use a music file which is downloadable via a music download service on an Internet connection, as the music file to be attached to the message service. Accordingly, the music recommendation system 100 may receive a selection from the user whether to use the music file collection 130 or to use the downloadable music file.

The music file selection unit 110 selects a music file according to a theme of the message service, a theme of the music, a mood of the music, and a similarity between content of the message service and content of the message service. Specifically, the music file selection unit 110 classifies the message service and the music file according to the theme of the message service, the theme of the music, the mood of the music, and the similarity between content of the message service and content of the message service, and selects a music file according to a result of the classification. Hereinafter, a configuration and operations of the music file selection unit 110 will be described in detail by referring to FIG. 2.

Figure 2:
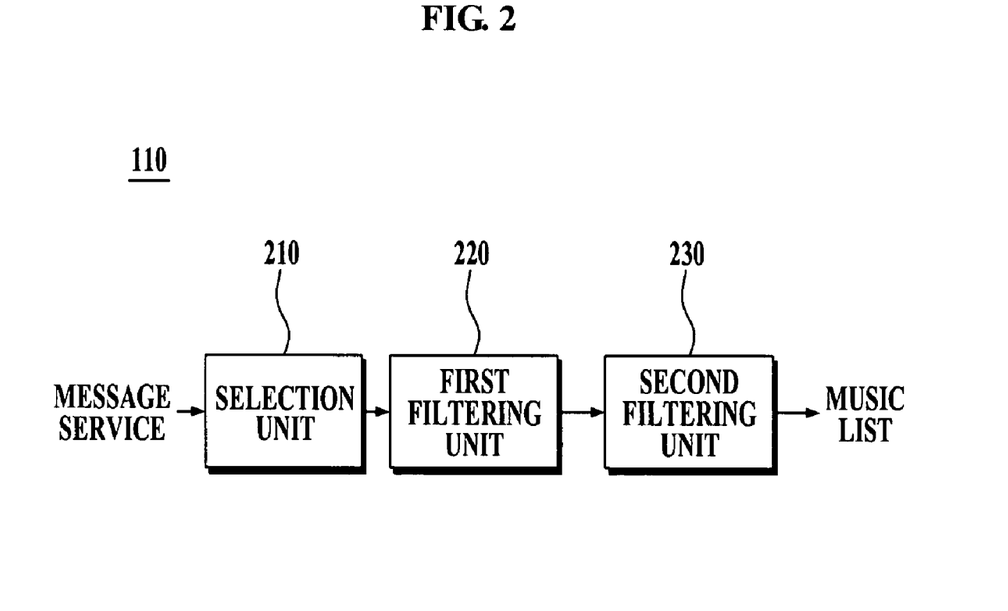
FIG. 2 is a diagram illustrating an example of a configuration of a music file selection unit of FIG. 1.

Referring to FIGS. 1 and 2, the music file selection unit 110 includes a selection unit 210, a first filtering unit 220, and a second filtering unit 230.

The selection unit 210 selects target music files, classifies the target music files and a message service according to a theme, and selects, from among the target music, a music file which corresponds to the theme of the message service according to a result of the classification. Hereinafter, a configuration and operations of the selection unit 210 will be described in detail by referring to FIG. 3.

Figure 3:
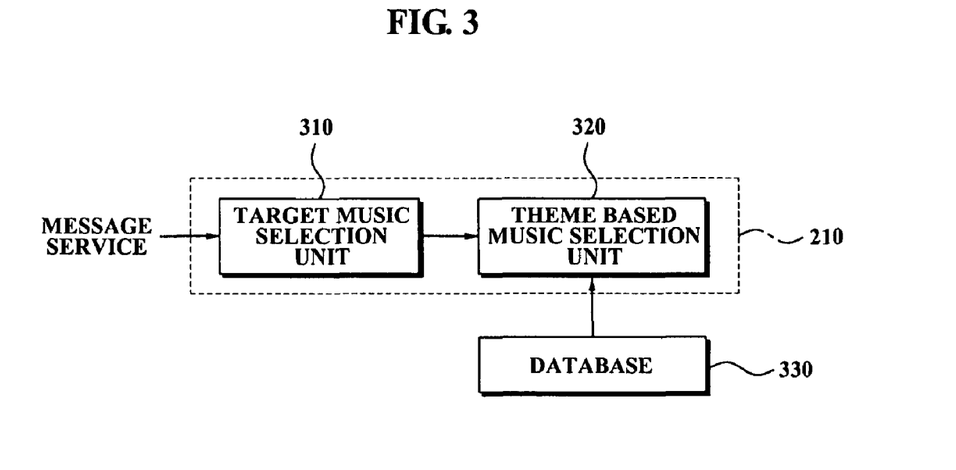
FIG. 3 is a diagram illustrating an example of a configuration of a selection unit of FIG. 2.

Referring to FIGS. 1 through 3, the selection unit 210 includes a target music selection unit 310 and a theme based music selection unit 320 which selects music according to a theme.

The target music selection unit 310 selects either a music file collection stored in a user terminal, or a music file which is downloadable via a music download service on an Internet connection, as the target music files. Specifically, the target music selection unit 310 may select either the music file from among music files in the user terminal, or the music file which is downloadable using the music download service on an Internet connection, as the target music files. The music recommendation system 100 receives a selection for the music file as the target music file, from the user via the target music selection unit 310.

The theme based music selection unit 320, selecting the music according to the theme, classifies the target music files according to the theme, and selects a plurality of music files according to the classified theme from among the target music files. Specifically, the theme based music selection unit 320 selects, from among the target music files, the plurality of music files according to the classified themes of the target music files and message service. As described, the music recommendation system 100 of FIG. 1 analyzes the theme of the target music files and the theme of the message service via the theme based music selection unit 320, and selects, from among the target music files, the plurality of the music files appropriate for the analyzed themes of the message service. Hereinafter, a configuration and operations of the theme based music selection unit 320 will be described in detail by referring to FIG. 5.

Figure 5:
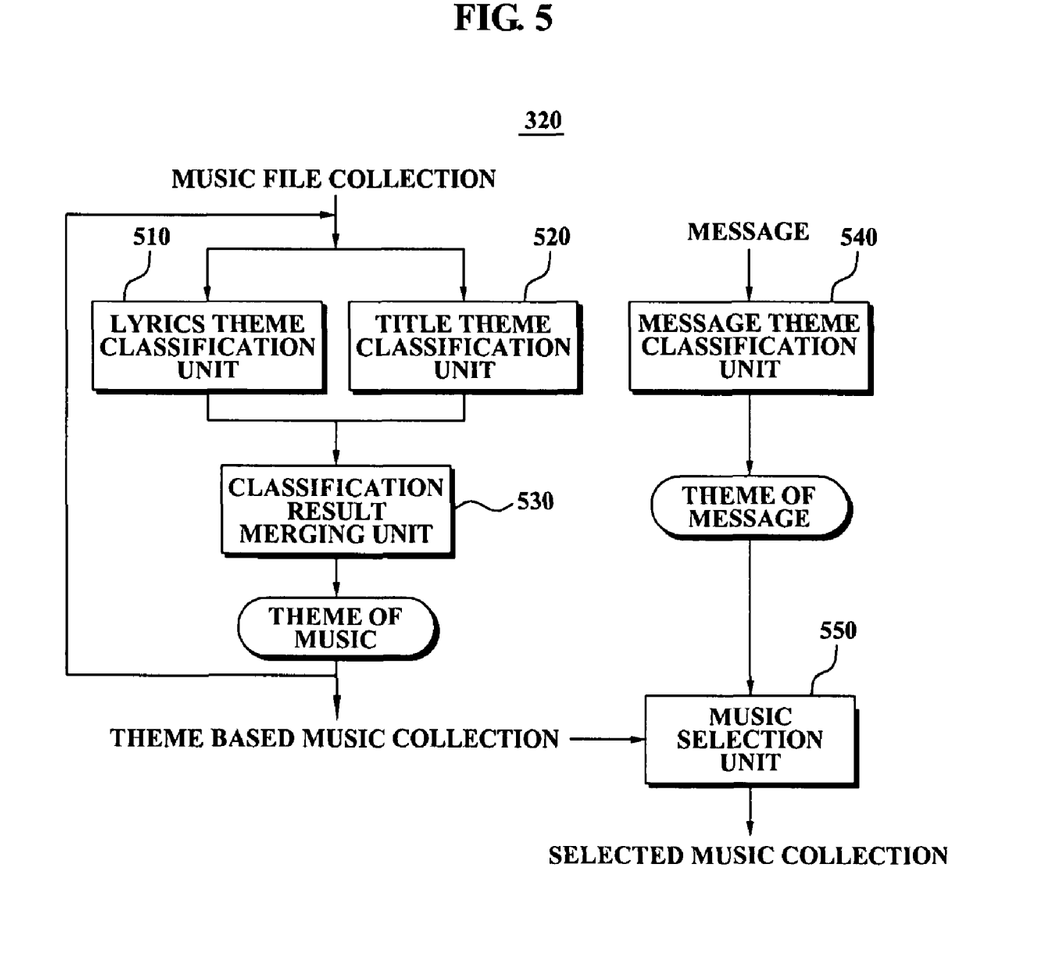
FIG. 5 is a diagram illustrating an example of a configuration of a theme based music selection unit of FIG. 3.

FIG. 5 is a diagram illustrating an example of a configuration of the theme based music selection unit 320 of FIG. 3.

Referring to FIG. 5, the theme based music selection unit 320 of FIG. 3 includes a lyrics theme classification unit 510, a title theme classification unit 520, a classification result merging unit 530, a message theme classification unit 540, and a music selection unit 550.

The lyrics theme classification unit 510 classifies lyrics of music files according to a theme. The lyrics theme classification unit 510 may omit operation of theme classification with respect to the music files when there is no information of the lyrics from the music files. The title theme classification unit 520 classifies titles of music files. Specifically, the title theme classification unit 520 extracts the title of a music file from an identification3 (ID3) tag of the music files or music file names of the music files, and classifies the title of the music files using the extracted title of the music files.

The classification results merging unit 530 merges a result of the classifications of the lyrics with a result of the title of music files, and outputs a theme of the music files.

The message theme classification unit 540 classifies a message service according to a theme, and outputs the classified theme of the message service.

The themes of the music files and the message service may be variously defined depending on categories such as sorrow, happiness, love, a breakup, yearning, spring, summer, autumn, winter, and a journey. When a specific music does not fall into the defined categories, the specific music may be classified into the others.

The music selection unit 550 selects a music file based on a the music files classified according to theme and the message service classified according to the theme. Specifically, the music selection unit 550 may select the music file which corresponds to the classified theme of the message service.

Figure 6:
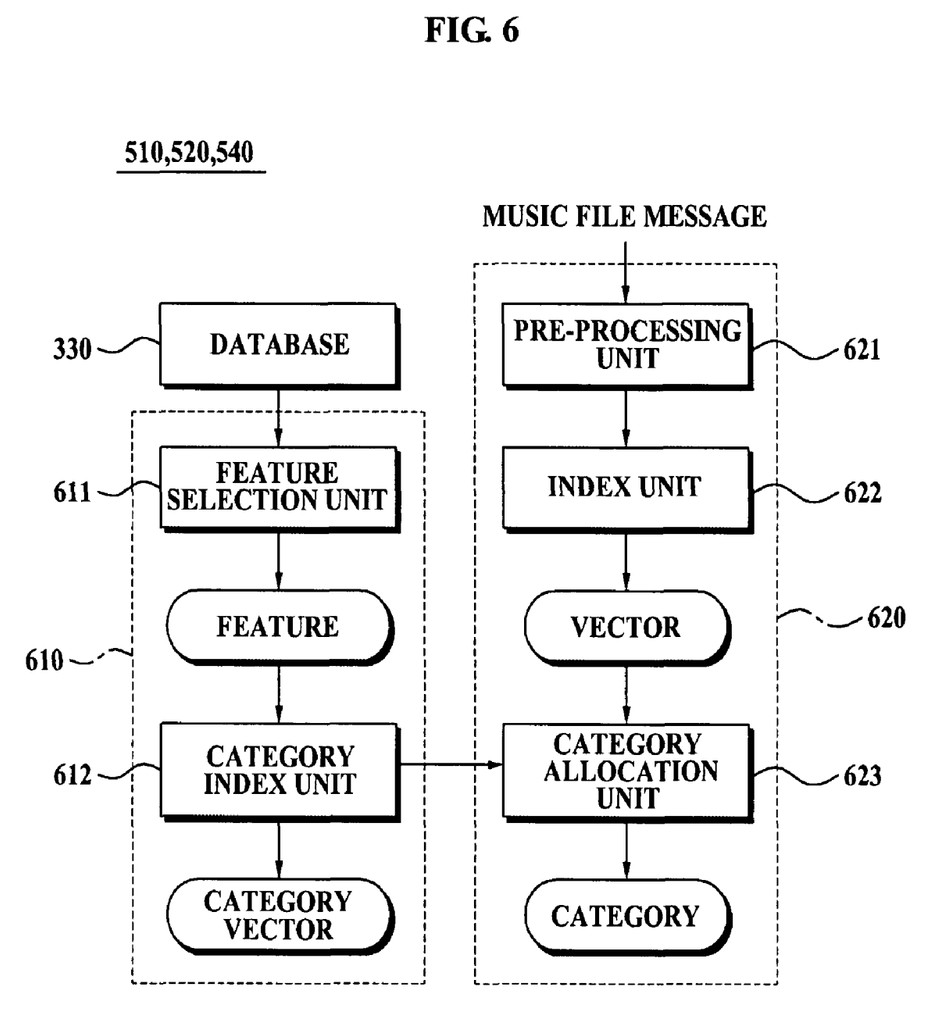
FIG. 6 is a diagram illustrating an example of a configuration of a lyrics theme classification unit, a title theme classification unit, and a message theme classification unit of FIG. 5.

FIG. 6 is a diagram illustrating an example of a configuration of the lyrics theme classification unit 510, the title theme classification unit 520, and the message theme classification unit 540 of FIG. 5.

Referring to FIG. 6, the lyrics theme classification unit 510, the title theme classification unit 520, and the message theme classification unit 540 includes a theme classification learning unit 610 and a theme classification unit 620.

The theme classification learning unit 520 performs learning for theme classification of music files stored in the database 330 of FIG. 3 and a message service, and includes a feature selection unit 611 and a category index unit 612. The database 330 may be previously built for the theme classification learning, and themes corresponding to the title of music, lyrics of the music and a message service are classified in the database 330. The music recommendation system 100 of FIG. 1 may use a lyrics database when it is difficult to build a database with respect to the message.

The feature selection unit 611 extracts feature candidates from the title of the music, the lyrics of the music stored in the database 330, the message service, and selects one feature to be used for the theme classification using the extracted feature candidates. The feature candidates may include a morpheme n-gram, a word n-gram, and a syllable n-gram. When a processing capability of the feature selection unit 611 is sufficient, the feature selection unit 611 uses the morpheme n-gram as the feature candidates, and when the processing capability of the feature selection unit 611 is insufficient for using the morpheme n-gram, the feature selection unit 611 may use the word n-gram or the syllable n-gram. The feature selection unit 611 may select the feature from the feature candidates using a mutual information scale, an information acquisition quantity, and Chi-square statistic. In the message service, an emoticon has important information, and is used for the feature since the emoticon is used for expressing emotions of a user. Accordingly, the emoticon is additionally collected to be used for the feature.

The category index unit 612 indexes a category of each theme using the selected feature. Namely, the category index unit 612 may express the category of each theme as a category vector including features and values. Each theme category vector has all of the selected features as the feature, and a feature of the category vector for each theme has '1' as a feature value when a corresponding feature is selected, the feature of the category vector for each theme has '0' as the feature value when the corresponding feature is not selected. The category index unit 612 outputs a result of the category index as the category vector.

The theme classification unit 620 classifies the theme of music files stored in the user terminal, or provided from a web server, and the theme of the message service inputted by the user, and includes a pre-processing unit 621, an index unit 622, and a category allocation unit 623.

The pre-processing unit 621 performs pre-processing on the music files and the message service in order to classify the music and the message service according to the theme. Namely, the pre-processing unit 621 extracts a title and lyrics from the music files, and acquires text information or emoticon information from the music files and the message service. The title may be extracted from an ID3 tag of the music files or the music file name.

The index unit 622 expresses the title, the lyrics of the music files, or the message service as a vector to index the expressed vector. Namely, the index unit 622 determines whether each feature of the selected feature is included in the title, the lyrics of the music files, or the message service, and indexes a value according to a result of the determination. Since words, directly associated with the theme of the music, are compressively shown in the title, the index unit 622 may allocate to index '1' when the feature is shown in the title, and may allocate to index '0' when the feature is not shown in the title after applying a binary weight to each of the feature values. The index unit 622 may allocate to index a frequency number, i.e. how many times a corresponding word occurs in the text, to the feature value by applying a frequency weight to the lyrics and the message service. The index unit 622 may output a result of the index as a vector.

The category allocation unit 623 determines the theme of the title, the lyric, and the message service using the category vector, the music vector, or the message vector, and allocates each category which corresponds to the determined theme. Specifically, the category allocation unit 623 determines the theme by measuring a similarity between the theme category vector, obtained by the category index unit 612, and the title, the lyrics, and the message service vectors, and allocates the each category which corresponds to the determined theme. As an example, a vector dot product (ab cos θ) or a cosine similarity may be used for the vector similarity.

The first filtering unit 220 of FIG. 2 analyzes the plurality of music files according to a mood, and filters out the plurality of music files, selected by the selection unit 210 of FIG. 2, based on the analyzed mood. Specifically, the first filtering unit 220 deletes music files whose theme of the music files and mood of the music files are not matched with each other. A matching relation between the mood of the music files and the theme of the music files may be understood by referring to a matching table in FIG. 7.

Figure 7:
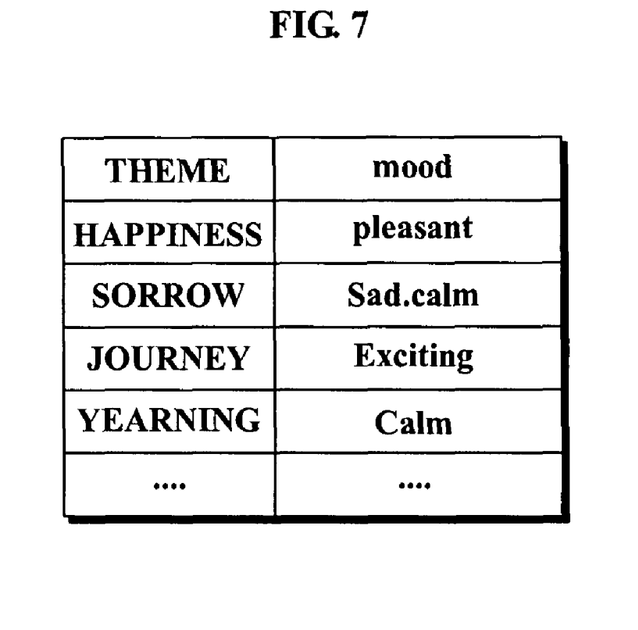
FIG. 7 is a diagram illustrating an example of a theme matching table and a mood matching table according to an exemplary embodiment of the present invention.

FIG. 7 is a diagram illustrating an example of a theme matching table and a mood matching table according to an exemplary embodiment of the present invention.

Referring to FIG. 7, a theme of a message service and a mood of a music file are matched with each other in the matching table. The theme of the message service includes happiness, sorrow, a journey, a yearning, etc., the mood of the music file includes pleasant, sad, calm, exciting, etc., and various types of classification may be used. The matching table may be stored in the database 330 of FIG. 3. There is a probability that a theme of music and a mood of the music do not match each other, from among the music files which correspond to the theme of the message service. As an example, when the theme of the music is a 'breakup', and the mood of the music is 'pleasant', this indicates the theme of the music and the mood of the music are not matched with each other.

Accordingly, the music recommendation system 100 of FIG. 1 deletes the music file whose mood of music does not match a theme of music. As an example, when a theme of the message service is 'breakup' while selecting the music, the music recommendation system 100 deletes a music file having an inappropriate mood for the theme of the music using the mood of the music, from among the selected music files, in order to prevent selecting a music file whose mood is pleasant, and selects a music file having an appropriate mood for the theme of the music. In this case, the music recommendation system 100 uses the mapping table in order to filter out the selected music file.

As an example, when a theme of the music file or a theme of the message service is 'happiness', and a mood of music corresponding to the theme is 'pleasant', a first filtering unit 220 of FIG. 2 may select music files whose mood of the music is 'pleasant' by filtering out music files from a plurality of music files whose mood of the music is not 'pleasant'.

As an another example, when a theme of the music file or a theme of the message service is 'sorrow', a mood of music corresponding to the theme is 'sorrow' or 'calm', a first filtering unit 220 may select music files whose mood of the music is 'sorrow' by filtering out music files whose mood of the music is not 'sorrow' or 'calm' from the plurality of music files.

As still another example, when a theme of the music file or a theme of the message service is 'journey', a mood of music corresponding to the theme is 'exciting', a first filtering unit 220 may select music files whose mood of the music is 'exciting' by filtering out music files whose mood of the music is not 'exciting' of the plurality from music files.

As yet another example, when a theme of the music file or a theme of the message service is 'yearning', a mood of music corresponding to the theme is 'calm', a first filtering unit 220 may select music files whose mood of the music is 'calm' by filtering out music files whose mood of the music is not 'calm' from the plurality of music files.

As described above, the music recommendation system 100 may provide a user with an appropriate number of music files when the appropriate number of music files is selected by the first filtering unit 220. However, when a number of a selected music files is great, there is a probability that there are music having an identical theme or mood, or the user wants to show something different via a message service even if music has an identical theme. Accordingly, the music recommendation system 100 according to the present invention measures a similarity between content of lyrics of music and content of a message service via a second filtering unit 230 of FIG. 2, and filters out the music according to the similarity.

The second filtering unit 230 calculates the similarity between the content of the message and the content of the music file, and filters out the music files according to the similarity.

The second filtering unit 230 may be omitted in order to increase a speed of the music recommendation system 100, or the second filtering unit 230 may be omitted when the number of music files selected by the first filtering unit 220 is relatively few. Hereinafter, a configuration and operations of the second filtering unit 230 will be described in detail by referring to FIG. 4.

Figure 4:
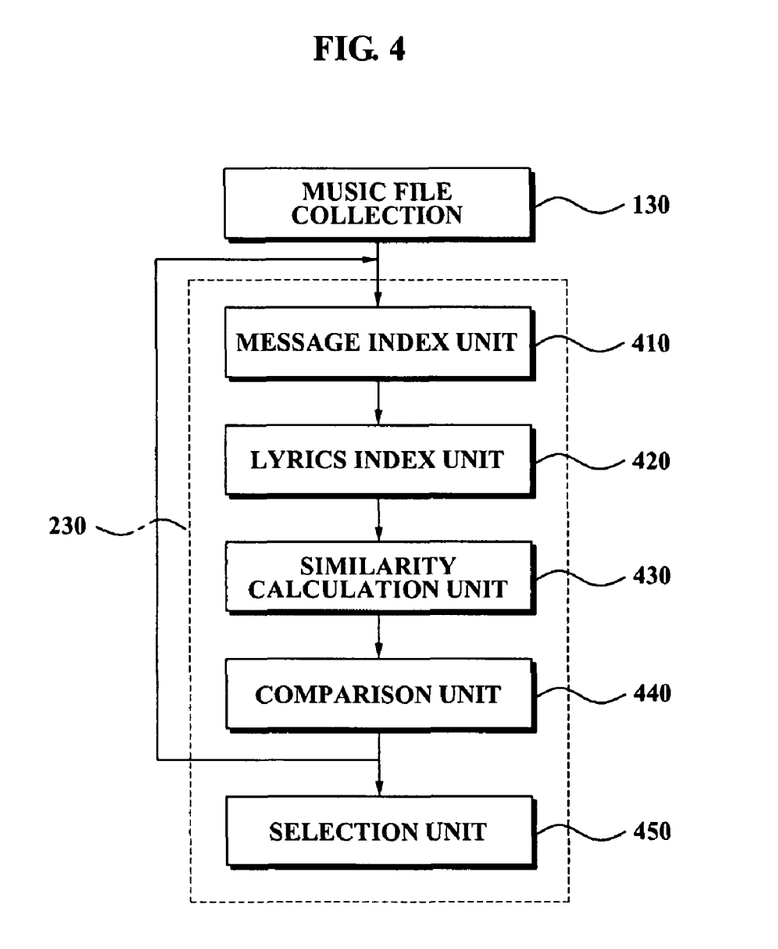
FIG. 4 is a diagram illustrating an example of a configuration of a second filtering unit of FIG. 2.

FIG. 4 is a diagram illustrating an example of a configuration of a second filtering unit 230 of FIG. 2.

Referring to FIG. 4, the second filtering unit 230 includes a message index unit 410, a lyrics index unit 420, a similarity calculation unit 430, a comparison unit 440, and a selection unit 450.

The message index unit 410 indexes a message service inputted by a user. Specifically, the message index unit 410 extracts character strings of a text from the message service inputted by the user, and indexes the message service by expressing the character strings of the text as a vector. A morpheme n-gram and a word n-gram may be used for the character strings of the text. The message index unit 410 may reduce a number of features by selecting the morpheme n-gram or the word n-gram, including morphemes having a substantial meaning such as a noun and an inflected word. The feature, having been used in the index unit 622, may be used for the feature of the vector.

The lyrics index unit 420 indexes the music files by expressing the lyrics and the title of the music files as a vector. In this case, features, which are indexed by the message index unit 410, may be used a feature for the vector. A feature value of the vector of the message service and features of the vectors of the lyrics and the title may be indexed by calculating a number of features occurring in the message service or the lyrics using a frequency weight.

The similarity calculation unit 430 calculates a similarity between content of the music files and content of the message service. Specifically, the similarity calculation unit 430 calculates the similarity between the content of the music files and the content of the message service using a vector of the indexed music files and a vector of the indexed message service. A cosine similarity may be used for the similarity between the content of the music files and the content of the message service.

The comparison unit 440 compares the similarity with a threshold value. The threshold value is defined via a predetermined experiment. Specifically, the comparison unit 440 compares the similarity with the threshold value to determine whether the similarity between the content of the music files and the content of the message service is greater than or equal to the threshold value, or less than the threshold value. When the similarity is less than the threshold value, operation process returns to the message index unit 410.

The selection unit 450 selects, from among the indexed music files, the music files when a similarity of a specific music file is greater than the threshold value. Specifically, the selection unit 450 may select music files whose similarity between content of music files and content of message service is greater than or equal to the threshold value.

The recommendation unit 120 of FIG. 1 recommends a music file corresponding to the theme of the message service, based on a result of the analysis. Specifically, the recommendation unit 120 may recommend the user a music list whose selected music files are arranged in a descending order according to a similarity. The recommendation unit 120 may include a music arrangement unit and a music list providing unit.

The music arrangement unit arranges the selected music files based on the similarity. The music arrangement unit may arrange the selected music files using a category, having been calculated by the category allocation unit 623 of FIG. 6, and the similarity between music themes. Specifically, the music arrangement unit may arrange the selected music files in an order similarity between the music themes and a theme category vector corresponding to the theme of the message service. Also, the music arrangement unit may arrange the selected music files based on the content similarity, having been calculated by the similarity calculation unit 430 of the second filtering unit 230. Specifically, the music arrangement unit may select music files in an order similarity with respect to the theme and the content of the indexed music files and the message service. The music arrangement unit may not operate when a number of the indexed music files is insufficient to arrange the music files, or the music arrangement unit may not operate by considering a speed of selecting the music files.

The music list providing unit provides a music list of the arranged music files. The music list provides information of music files with respect to the arranged music files, and the information of the music files may include information of the title, lyrics, a singer of the music. The user may check the information of the title, lyrics, the singer of the music on the music list, and may select required music or may select after listening to the music.

Figure 8:
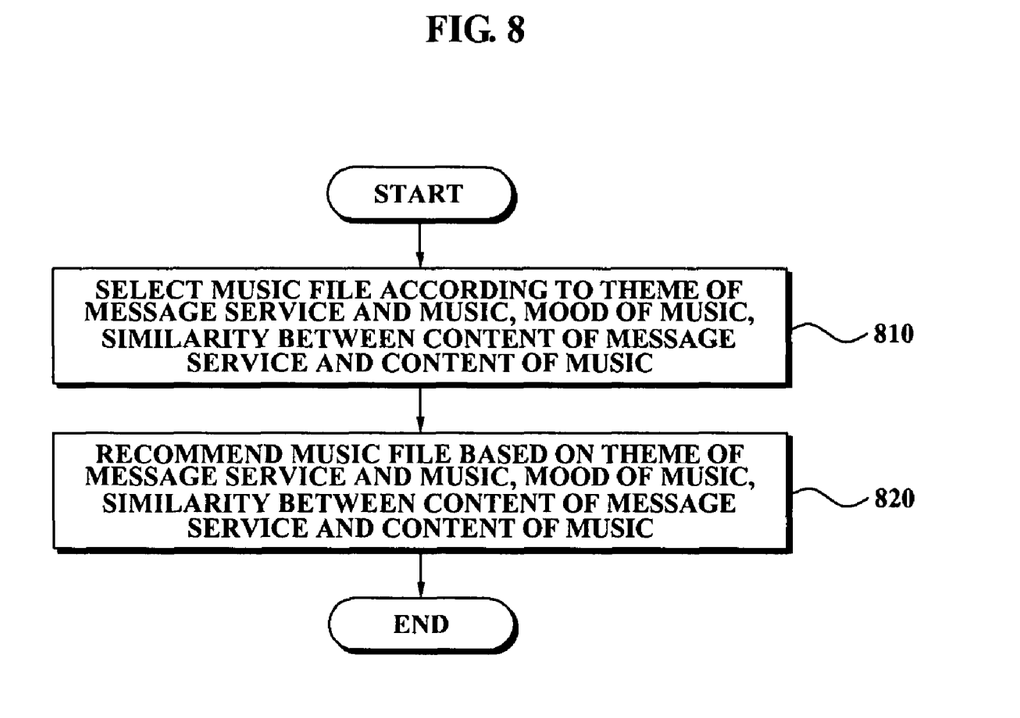
FIG. 8 is a flowchart illustrating a music recommendation method with respect to a message service according to another embodiment of the present invention.

FIG. 8 is a flowchart illustrating a music recommendation method with respect to a message service according to another embodiment of the present invention.

Referring to FIG. 8, in operation 810, a music recommendation system selects music files according to a theme of the message service and music, a mood of the music, a similarity between content of the message service and content of the music. Herein after, the selecting of the music files will be described in detail by referring to FIG. 9.

Figure 9:
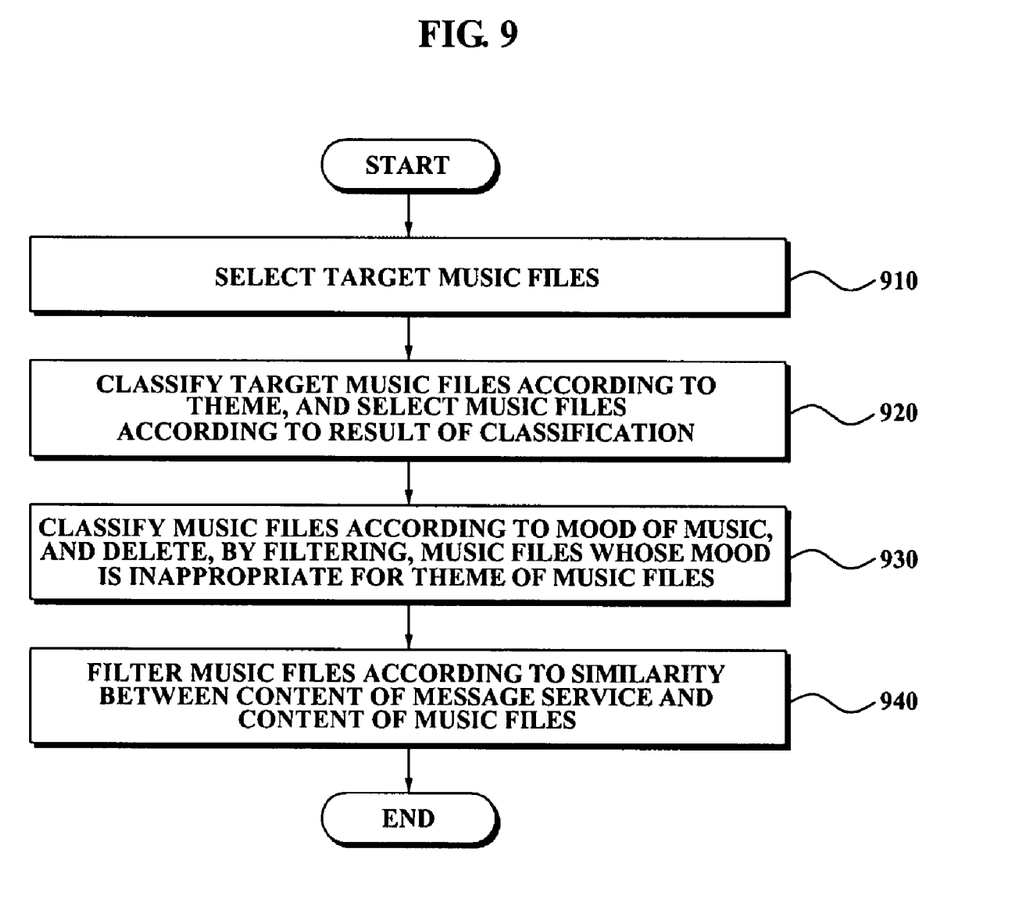
FIG. 9 is a flowchart illustrating an example of operations of analyzing themes of FIG. 8.

FIG. 9 is a flowchart illustrating an example of operations of analyzing themes of FIG. 8.

Referring to FIG. 9, in operation 910, a music recommendation system selects target music files. Specifically, in operation 910, the music recommendation system selects either a music file stored in a user terminal or a music file which is downloadable via a music download service on an Internet connection, as the target music files.

In operation 920, the music recommendation system classifies the target music files and the message service according to a theme, and selects, from among the target music files, a plurality of music files which corresponds to the theme of the message according to a result of the classification. Hereinafter, the classification of the target music files will be described in detail by referring to FIG. 10.

Figure 10:
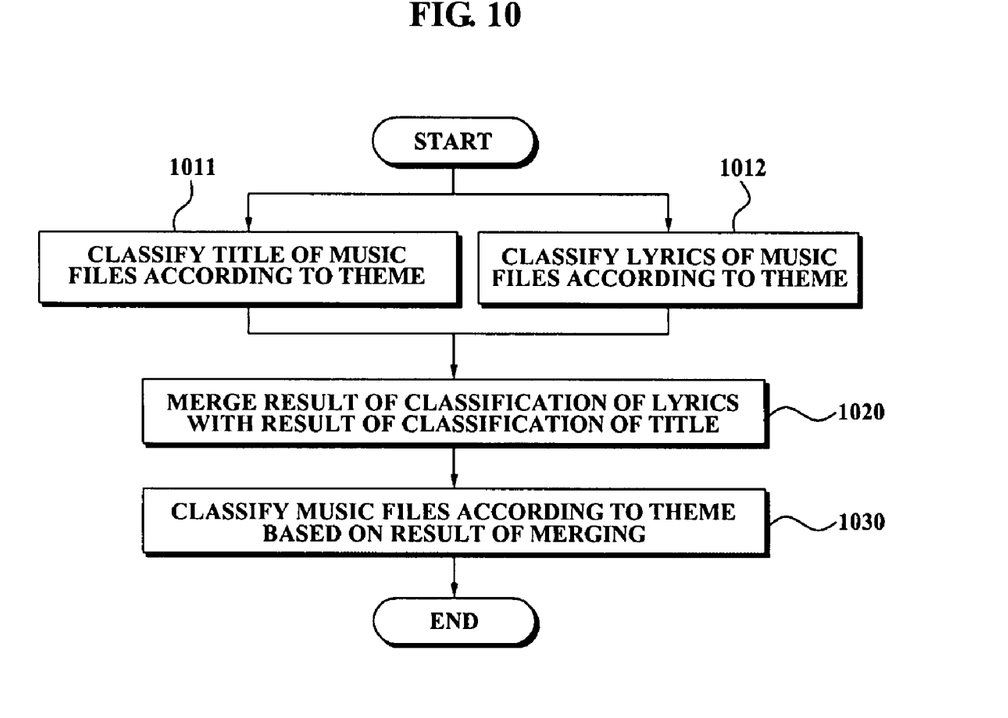
FIG. 10 is a flowchart illustrating operations of classification of music files according to a theme of FIG. 9.

FIG. 10 is a flowchart illustrating operations of the classifying of the music files according to the theme of FIG. 9.

Referring to FIG. 10, in operation 1011, a music recommendation system classifies a title of music of target music files according to a theme.

In operation 1012, the music recommendation system classifies lyrics of the music of the target music files.

In operation 1020, the music recommendation system merges a result of the classification of the lyrics with a result of the classification of the title.

In operation 1030, the music recommendation system classifies the target music files according to a theme, based on the merged results of the classification of the lyrics and the title. A theme of the music files may be variously defined depending on categories such as sorrow, happiness, love, a breakup, yearning, spring, summer, autumn, winter, and a journey. When a specific music does not fall into the defined categories, the specific music may be classified into the others. Hereinafter, the selecting of the target music files will be described in detail by referring to FIG. 11.

Figure 11:
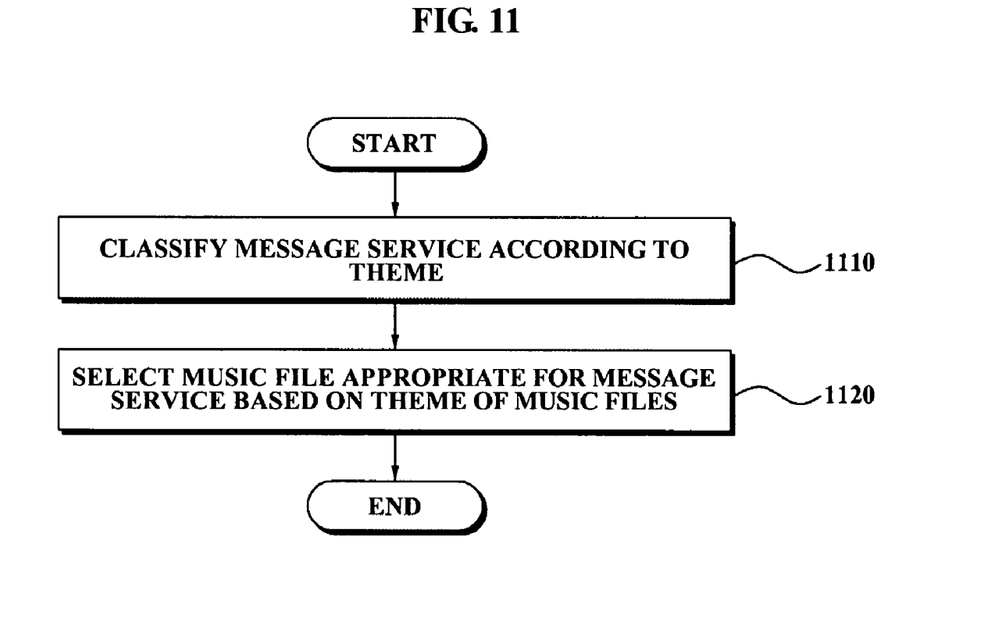
FIG. 11 is a flowchart illustrating an example of operations of selecting music files according to the theme of FIG. 9.

FIG. 11 is a flowchart illustrating an example of operations of selecting a music file according to the theme of FIG. 9.

Referring to FIG. 11, in operation 1110, a music recommendation system classifies a message service according to a theme. Similar to the theme of the target music files, the theme of the message service may be variously defined depending on categories such as sorrow, happiness, love, a breakup, yearning, spring, summer, autumn, winter, and a journey. When a specific music does not correspond to the defined categories, the specific music may be classified into the others.

In operation 1120, the music recommendation system selects music files appropriate for the theme of the message service based on the classified theme of the music target music files. Specifically, in operation 1120, the music recommendation system may select a plurality of music files corresponding to the theme of the classified message service, from a collection of the classified target music files.

In operation 930, the music recommendation system classifies the plurality of music files according to a mood, and filters out a music file whose mood is inappropriate for the theme of the music files.

In operation 940, the music recommendation system filters the plurality of the music files according to a similarity between content of the message service and content of the music files. Hereinafter, the filtering of the plurality of the music files according to the similarity between the content of the message service and the content of the music files will be described in detail by referring to FIG. 12.

Figure 12:
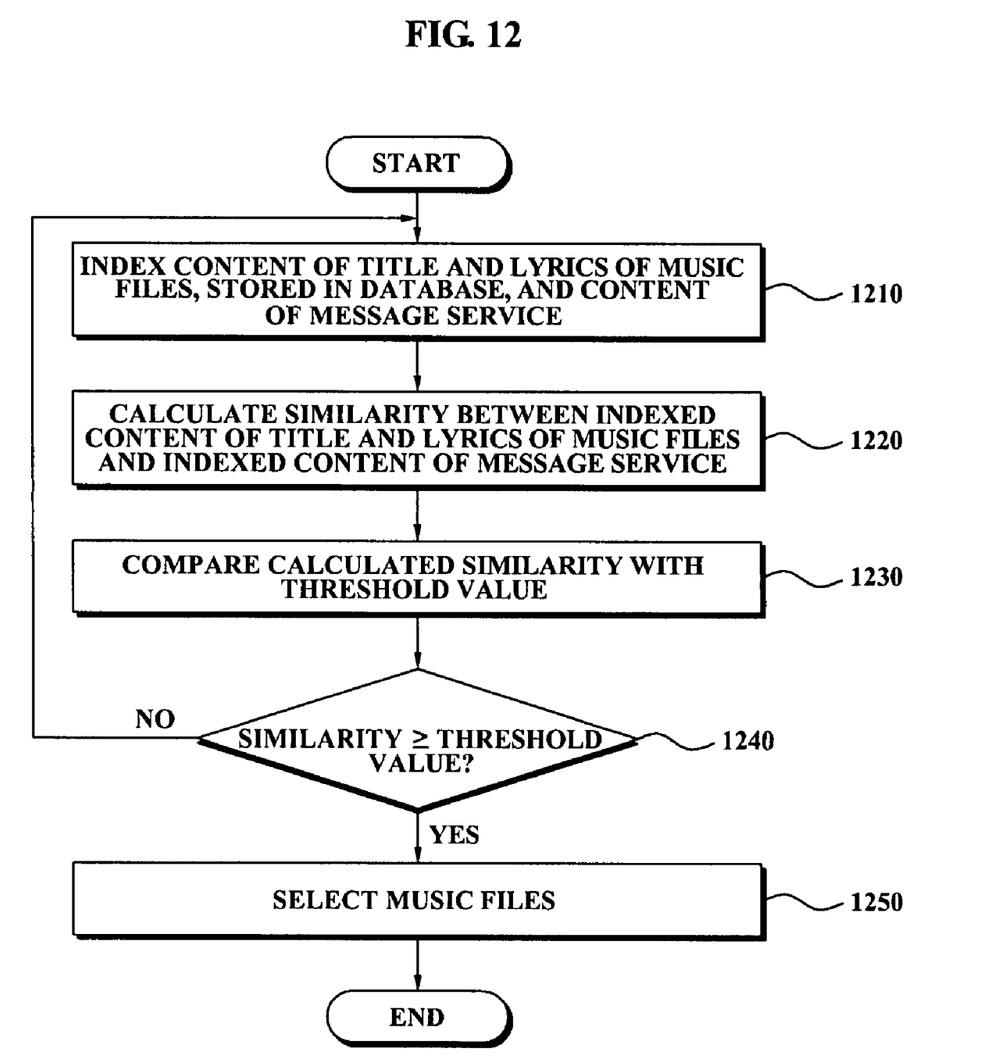
FIG. 12 is a flowchart illustrating an example of filtering of a plurality of music files according to a similarity of FIG. 9.

FIG. 12 is a flowchart illustrating an example of the filtering of the plurality of music files according to the similarity of FIG. 9.

Referring to FIG. 12, in operation 1210, a music recommendation system indexes a title and lyrics of music files, stored in a database, and content of a message service. Specifically, in operation 1210, the music recommendation system extracts character strings of a text from the message service inputted by the user, and indexes the message service by expressing the character strings of the text as a vector. In this case, a morpheme n-gram and a word n-gram may be used for the character strings of the text, and features to be selected in operation 1310 may be used for the character strings of the text. Feature values may be indexed by calculating a number of each features' occurring in the message service or the lyrics using a frequency weight.

In operation 1220, the music recommendation system calculates a similarity content of indexed music files and content of indexed message service. Specifically, in operation 1220, the music recommendation system calculates the similarity between the content of the music files and the content of message service using a vector of the content of the indexed music files and a vector of the content of the indexed message service. In this case, a cosine similarity may be used for the similarity between the content of the music files and the content of the message service.

In operation 1230, the music recommendation system compares the similarity with a threshold value. Specifically, the music recommendation system compares the similarity with the threshold value to determine whether the similarity between the content of the music files and the content of the message service is greater than or equal to the threshold value, or less than the threshold value.

In operation 1240, the music recommendation system determines whether the similarity is greater than the threshold value. When the similarity is less than the threshold value, operation process returns to operation 1210.

In operation 1250, the music recommendation system selects music files whose similarity is greater than the threshold value. Specifically, in operation 1250, the music recommendation system may select the music files whose similarity between the content of the music files and the content of the message service is equal to or greater than the threshold value.

Figure 13:
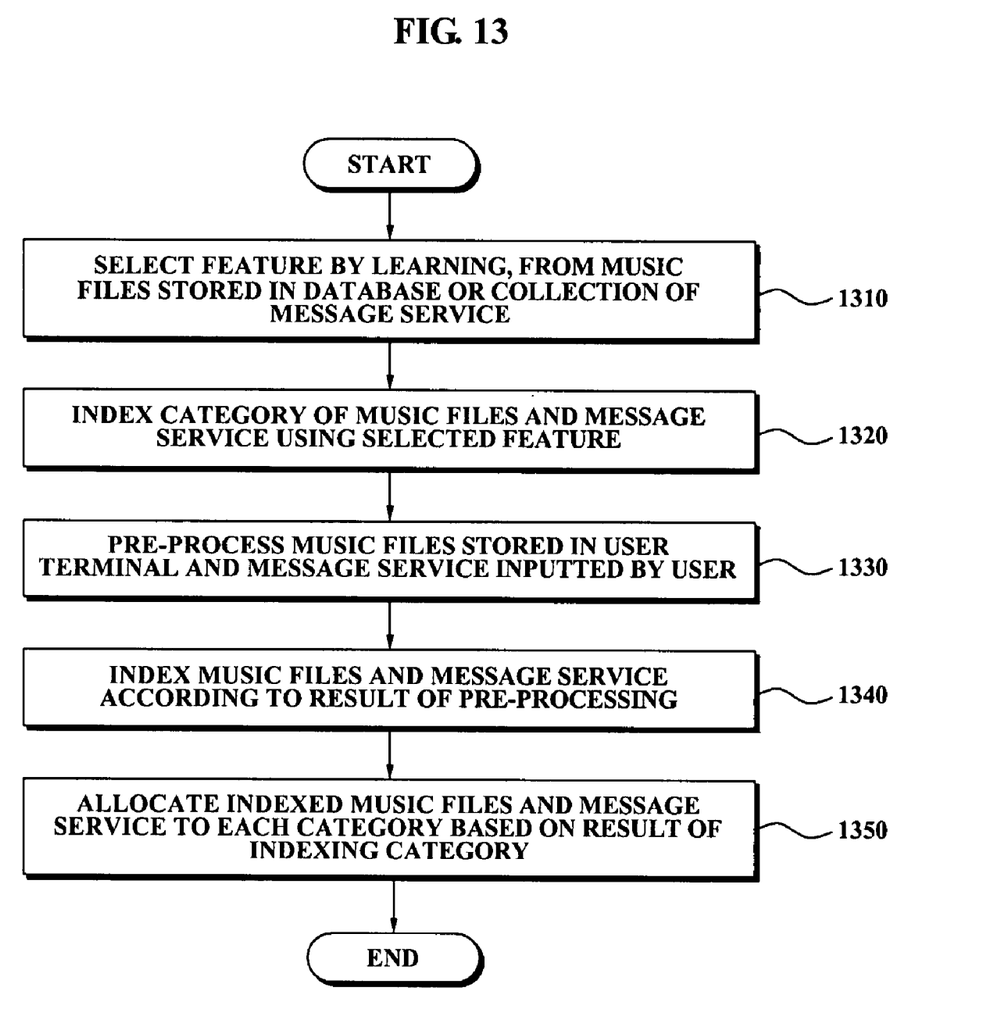
FIG. 13 is a flowchart illustrating an example of operations of classification of a theme of lyrics, a theme of a title, and a theme of a message service of FIG. 11.

FIG. 13 is a flowchart illustrating an example of operations of classification of a theme of lyrics, a theme of a title, and a theme of a message service of FIG. 11.

Referring to FIG. 13, in operation 1310, a music recommendation system selects a feature via learning, from music files stored in a database or a collection of a message service.

Specifically, in operation 1310, the music recommendation system may select the feature to be used for theme classification, from a title and lyrics of the music files stored in the database or the message service.

In operation 1320, the music recommendation system indexes one of a category of the music files or the message service using the selected feature.

In operation 1330, the music recommendation system pre-processes the music files stored in a user terminal and the message service inputted by a user.

In operation 1340, the music recommendation system indexes a music file and a message service according to a result of the pre-processing.

In operation 1350, the music recommendation system allocates each category to the indexed music files and the message service based on a result of the category index.

Operations 1310 and 1320 are performed using a music file collection stored in the database, the database being previously built, and the message service. Also, operations 1310 and 1320 may be performed in advance when building a system, not at a point of when a user uses the system, since operations 1310 and 1320 correspond to operation of the learning. Operations 1330, 1340, and 1350 are performed during operation of classification of music and a message, and a target of operations 1330, 1340, and 1350 is a music file in a user terminal or a message service to be transmitted by the user.

In operation 820, the music recommendation system recommends appropriate music files for the message service to the user based on the themes calculated in operation 810 and a similarity value between the contents of the music files and the message service. Specifically, in operation 820, the music recommendation system arranges the music files based on themes calculated in operation 810 and the similarity value between the contents of the music files and the message service to recommend the arranged music files to the user.

As an example, in operation 820, the music recommendation system may recommend to the user a music list whose selected music files are arranged in a descending order by using the similarity value. Specifically, in operation 820, the music recommendation system may include the arranging of the selected music files, and the providing of the music list of the arranged selected music files. The music list may include a title, lyrics, and a singer of music. The user may check information of the title, the lyrics, and the singer of the music on the music list, and select required music or select after listening to the music.

The music recommendation method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there are provided a music recommendation method which can select a music file according to a theme of the music, a mood of the music, and a similarity between content of a message service and content of the music, and automatically recommend to a user the selected music file, and a music recommendation system using the method.

Also, according to the present invention, there are provided a music recommendation method which can classify a title of music, lyrics of the music, and a text of a message service according to a theme, compare the classified theme, and select the music as a result of the comparison, and a music recommendation system using the method.

Also, according to the present invention, there are provided a music recommendation method which can recommend music, which is matched with a theme of a message service, by classifying music according to a theme, and also classifying the music according to a mood in a personal communication terminal, and a music recommendation system using the method.

Also, according to the present invention, there are provided a music recommendation method which can accurately select music, which is matched with a message service, by calculating a similarity between content of lyrics and content of the message service, and a music recommendation system using the method.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A music recommendation method with respect to a message inputted by a user, for transmitting via a message service in a personal communication terminal, the method comprising:

selecting music files according to a theme of the message, a theme of a music, and a mood of the music, determining whether the number of selected music files is greater than a predetermined number, and, if the number of selected music files is greater than the predetermined number, then further selecting music files from the selected music files according to a similarity between content of the message and content of the music; and recommending the selected music files to the user, wherein the selecting of the music files includes selecting target music files;

wherein the selecting of the target music files selects either a music file which is stored in a personal mobile terminal, or is downloadable via an Internet connection;

wherein the content of the music is a title and lyrics of the music;

wherein the title and the lyrics of the music are classified according to the theme using a feature selected from feature candidates using a mutual information scale, an information acquisition quantity or Chi-square statistic; and wherein the music is classified according to the theme using a result of the classification of the lyrics and a result of the classification of the title.

2. The method of claim 1, wherein the selecting of the music files further comprises:

classifying the target music files and the message according to a theme, and selecting, from among the target music files, a music file which corresponds to the theme of the message according to a result of the classification;

classifying a plurality of the music files, selected from among the target music files according to a mood, and filtering out at least one of the plurality of music files whose mood is inappropriate for the theme of the message of a list of the plurality of the music files, according to a result of the theme classification; and filtering out the plurality of the music files according to the similarity between the content of the message and the content of the music files.

3. The method of claim 2, wherein the recommending of the selected music files to the user comprises:

arranging the plurality of the music files, selected from among the target music files according to the mood, based on the similarity; and providing a list of the arranged plurality of the music files, selected from among the target music files according to the mood.

4. The method of claim 2, wherein the filtering out of the plurality of music files according to the similarity between the content of the message and the content of the music files comprises:

indexing the content of the message and the content of the music files;

calculating a similarity between the indexed content of the message and the indexed content of the music files;

comparing the calculated similarity with a threshold value; and selecting the music files when the similarity is greater than the threshold value.

5. The method of claim 2, wherein the classifying of the target music files according to the theme comprises:

classifying lyrics of the music files according to the theme;
classifying a title of the music files according to the theme;
merging a result of the classification of the lyrics with a result of the classification of the title; and
the classifying the target music files according to the theme, is based on a result of the merged classification.

6. The method of claim 5, wherein the selecting of the target music files according to the classified theme comprises:

classifying the message according to the theme; and
selecting target music files appropriate for the theme of the message based on the classified theme of the music files.

7. The method of claim 5, wherein the classifying of the lyrics, the title, or the message according to the theme comprises:

selecting a feature to be used for the theme classification from music files, stored in a database, or a collection of the message;

indexing one category using the selected feature;

pre-processing the music files stored in a personal mobile terminal and a message inputted by the user;

indexing the music files and the message according to a result of the pre-processing; and allocating each category to the indexed music files and the message based on a result of the indexing of the category.

8. The method of claim 6, wherein the classifying of the lyrics, the title, or the message according to the theme comprises:

selecting the feature to be used for the theme classification from music files, stored in a database, or a collection of the message;

indexing one category using the selected feature;

pre-processing the music files stored in the personal communication terminal and a message inputted by the user;

indexing the music files and the message according to a result of the pre-processing; and allocating each category to the indexed music files and the message based on a result of the indexing of the category.

9. A computer-readable storage medium storing a program for implementing a music recommendation method with respect to a message inputted by a user, for transmitting via a message service in a personal communication terminal, the method comprising:

selecting music files according to a theme of the message, a theme of a music, and a mood of the music, determining whether the number of selected music files is greater than a predetermined number, and, if the number of selected music files is greater than the predetermined number, then further selecting music files from the selected music files according to a similarity between content of the message and content of the music; and recommending the selected music files to the user, wherein the selecting of the music files includes selecting target music files;

wherein the selecting of the target music files selects either a music file which is stored in a personal mobile terminal, or is downloadable via an Internet connection;

wherein the content of the music is a title and lyrics of the music;

wherein the title and the lyrics of the music are classified according to the theme using a feature selected from feature candidates using a mutual information scale, an information acquisition quantity or Chi-square statistic; and wherein the music is classified according to the theme using a result of the classification of the lyrics and a result of the classification of the title.

10. A music recommendation system with respect to a message inputted by a user, for transmitting via a message service in a personal communication terminal, the system comprising:

a music file selection unit to select music files according to a theme of the message, a theme of a music, and a mood of the music, determining whether the number of selected music files is greater than a predetermined number, and, if the number of selected music files is greater than a predetermined number, then further selecting music files from the previously selected music files according to a similarity between content of the message, and content of the music; and a recommendation unit to recommend the selected music files to the user, wherein the music file selection unit includes a selection unit to select target music files, classify the target music files and the message according to a theme, and select, from among the target music files, a music file which corresponds to the theme of the message according to a result of the theme classification, wherein the selection unit comprises:

a target music selection unit to select a music file which is stored either in a user terminal, or is downloadable via an Internet connection as the target music files; and a theme based music selection unit to classify the target music files and the message according to a theme, and to select, from among the target music files, a plurality of music files according to the classified theme, wherein the content of the music is a title and lyrics of the music, wherein the title and the lyrics of the music are classified according to the theme using a feature selected from feature candidates using a mutual information scale, an information acquisition quantity or Chi-square statistic, and wherein the music is classified according to the theme using a result of the classification of the lyrics and a result of the classification of the title.

11. The system of claim 10, wherein the music file selection unit further comprises:
- a first filtering unit to classify the music files, selected from among the target music, according to a mood, and to filter out a music file based on the mood of the music; and
- a second filtering unit to calculate a similarity between content of the message and content of the music.

12. The system of claim 11, wherein the second filtering unit comprises:
- a message index unit to index a message inputted by the user;
- a lyrics index unit to index a title of the selected music files and content of lyrics;
- a similarity calculation unit to calculate a similarity between the indexed content of the lyrics and the content of the message;
- a comparison unit to compare the calculated similarity with a threshold value; and
- a selection unit to select the music files when the similarity is greater than the threshold value.

13. The system of claim 12, wherein the recommendation unit further comprises:
- a music arrangement unit to arrange the plurality of the selected music files based on the similarity; and
- a music list providing unit to provide a list of the arranged plurality of the selected music files.

14. The system of claim 11, wherein the theme based music selection unit comprises:
- a lyrics theme classification unit to classify lyrics of the music files according to a theme;
- a title theme classification unit to classify a title of the music files according to a theme;
- a message theme classification unit to classify the message according to a theme;
- a classification result merging unit to merge a result of the classifications of the lyrics with a result of the classifying of the title; and
- a music selection unit to select the plurality of the music files based on a music collection classified according to the theme and the message classified according to the theme.

15. The system of claim 14, wherein the lyrics theme classification unit, the title theme classification unit, and the message theme classification unit each comprises:
- a feature selection unit to select one of a feature of the title, the lyrics, or the message, which is used for the theme classification from a database;
- a category index unit to index one of a category of the title, the lyrics, or the message using the feature;
- a pre-processing unit to pre-process one of the title, the lyrics, or the message stored in the user personal communication terminal;
- an index unit to index the music files and the message according to a result of the pre-processing; and
- a category allocation unit to allocate each category to the indexed music files and the message based on a result of the indexing of the category.

* * * * *